(12) United States Patent
McGuigan

(10) Patent No.: US 8,387,519 B2
(45) Date of Patent: Mar. 5, 2013

(54) MARSHMALLOW ROASTING STICK

(76) Inventor: Michael McGuigan, Fort Myers Beach, FL (US)

( * ) Notice: Subject to any disclaimer, the term of this patent is extended or adjusted under 35 U.S.C. 154(b) by 1212 days.

(21) Appl. No.: 12/135,800

(22) Filed: Jun. 9, 2008

(65) Prior Publication Data
US 2009/0301314 A1 Dec. 10, 2009

(51) Int. Cl.
*A47J 37/06* (2006.01)
(52) U.S. Cl. ............ 99/421 A; 99/419; 221/59; 221/199
(58) Field of Classification Search .............. 99/421 A, 99/419, 421 H, 421 HH, 371, 450.4, 450.7; 221/103, 251, 244, 312 A
See application file for complete search history.

(56) References Cited

U.S. PATENT DOCUMENTS

| | | | | |
|---|---|---|---|---|
| 536,445 A | * | 3/1895 | Rockwell | 235/123 |
| 1,284,597 A | * | 11/1918 | Clinchy | 221/279 |
| 2,442,551 A | * | 6/1948 | Schaefer et al. | 30/129 |
| 2,483,546 A | * | 10/1949 | Kaminski | 30/129 |
| 2,876,694 A | * | 3/1959 | Thomas | 99/421 A |
| 3,228,555 A | * | 1/1966 | Pinto | 221/199 |
| 4,283,082 A | * | 8/1981 | Tracy | 294/15 |
| 6,286,418 B1 | * | 9/2001 | Berke et al. | 99/421 A |
| 6,739,477 B1 | * | 5/2004 | Pascual | 221/199 |
| 2006/0021993 A1 | * | 2/2006 | Martin | 221/312 A |
| 2006/0027592 A1 | * | 2/2006 | Flamingo et al. | 221/103 |

* cited by examiner

*Primary Examiner* — Gene Kim
*Assistant Examiner* — John E Simms, Jr.

(57) ABSTRACT

A roasting apparatus is provided which includes a shaft having a first end adapted to receive an edible wafer via an internal opening in the wafer, a second end, and a retaining portion near the second end that is adapted to removably retain the edible wafer to the shaft. The first end has a first shape adapted to enable the wafer to travel along the first end of the shaft towards the retaining portion with the retaining portion having a second shape different from the first shape and adapted to removably engage the wafer when moved from the first end to the retaining portion such that the shaft may be tilted down relative to the second end without the wafer traveling due to gravity beyond the retaining portion.

5 Claims, 6 Drawing Sheets

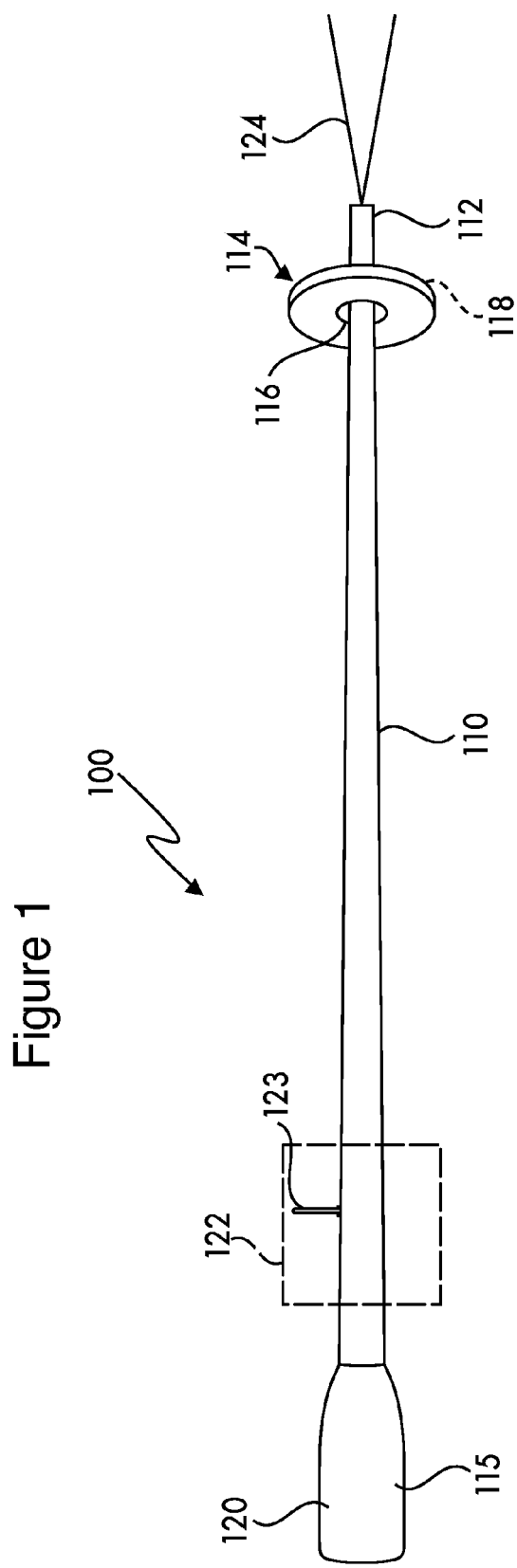

US 8,387,519 B2

MARSHMALLOW ROASTING STICK

FIELD OF THE INVENTION

This invention relates to skewers or sticks used to roast marshmallows and, in particular to a skewer or stick adapted to retain edible wafers on the skewer or stick for selective combination with a roasted marshmallow.

BACKGROUND OF THE INVENTION

Roasting a marshmallow over an open fire and combining the roasted marshmallow with gram crackers and chocolate has long been a popular food item referred to as a Smore. The typical preparation of a Smore involves roasting marshmallows on a skewer over an open fire until the marshmallows are cooked, then removing the roasted marshmallows from the skewer and placing them between two gram crackers along with a flat chocolate bar.

Typically, a person who has roasted a marshmallow must move quickly to place the roasted marshmallow on a bottom gram cracker that has been prearranged with a separate piece of a flat chocolate bar on top of the bottom gram cracker. Using another ("top") gram cracker, the person sandwiches the roasted marshmallow between the chocolate bar on the bottom gram cracker and the top gram cracker, and then pulls the skewer free of the roasted marshmallow while applying pressure to the top and bottom gram crackers. Thus, due to the pliability of roasted marshmallows, the preparation of a Smore has typically been a messy endeavor. Additionally, the conventional method of making a Smore requires separate containers for the gram crackers and chocolate bars.

In view of these problems, it is highly desirable to have a single apparatus for roasting marshmallows over an open fire or other heating source which can simply and cleanly roast marshmallows and dispense gram crackers and chocolate to create a Smore.

SUMMARY OF THE INVENTION

Methods and articles of manufacture consistent with the present invention provide a roasting apparatus adapted to roast a marshmallow over a heat source, such as an open fire pit. The roasting apparatus includes a shaft having a first end adapted to receive an edible wafer via an internal opening in the wafer, a second end, and a retaining portion near the second end that is adapted to removably retain the edible wafer to the shaft.

In one embodiment, the first end has a first shape adapted to enable the wafer to travel along the first end of the shaft towards the retaining portion with the retaining portion having a second shape different from the first shape and adapted to removably engage the wafer when moved from the first end to the retaining portion such that the shaft may be tilted down relative to the second end without the wafer traveling due to gravity beyond the retaining portion.

Further, in yet another embodiment, the roasting apparatus includes a memory flex element extending from the retaining portion of the shaft. The memory flex element is adapted to be biased in a direction along a length of the shaft to allow the wafer to travel past the memory flex element and to inhibit the wafer from traveling past the memory flex element when no bias is applied to the memory flex element.

In yet another embodiment, the retaining portion includes an outer surface, an inner chamber, a first channel between the outer surface and the inner chamber, a biasing element, and a stop element operatively coupled to the biasing element such that the stop element is adapted to be moved between a first position in which the stop element extends above the outer surface of the wafer beyond the first channel and a second position in which the stop element is lowered relative to the outer surface to enable the wafer to travel beyond the first channel. Additionally, the retaining portion may also include a lever having a first end pivotally attached to a lower inner wall of the chamber and a second end operatively coupled via the biasing element to an upper inner wall of the chamber. In this embodiment, the stop element is attached to the lever between the first and second ends. In one implementation, the shaft outer surface defines an opening relative to the second end of the lever and the lever to include a projection extending from the second end of the lever though the opening and adapted, when depressed, to counter bias the biasing element. In another implementation, the outer surface of the retaining portion defines a second channel disposed between the first channel and the second end of the shaft. In this implementation, the roasting apparatus comprises a second stop element disposed in and adapted to travel along the second channel, and a second biasing element operatively coupled to the second stop element and adapted to bias the second stop element towards the first channel.

Further, in yet another embodiment, the retaining portion of the shaft includes an outer surface, an inner chamber, a rod disposed within the chamber and having a first end and a second end, a biasing element operatively coupling the second end of the rod to the second end of the shaft, a first channel disposed between the outer surface and the chamber, and a memory flex stop element attached to and extending from the rod in proximity to the first end of the rod. In this embodiment, the memory flex stop element is adapted to removeably engage the first channel to inhibit travel of the wafer beyond the first channel. In one implementation, the outer surface of the retaining portion defines another channel disposed between the first channel and the second end of the shaft, and the rod includes a projection extending from the second end of the rod though the other channel. The projection is adapted to disengage the memory flex stop element channel from the first channel when the projection is depressed relative to the shaft. In another implementation, the outer surface of the retaining portion may define an opening between the first channel and the second channel, and the rod may include a secondary stop element corresponding to the memory flex stop element. In this implementation, the secondary stop element is adapted to removeably engage the opening in the outer surface when the memory flex stop element removeably engages the first channel. Further, the biasing element biases the rod and the memory flex stop element towards the second end of the shaft, and the projection is adapted to disengage the memory flex stop element channel from the first channel when the projection is depressed relative to the shaft causing the secondary stop element to be disengaged from the opening corresponding to the respective memory flex stop element. In this implementation, the retaining portion of the shaft may further include a wafer backstop element disposed within a third channel extending a length along a direction co-axial with the shaft between the first channel and the opening, and another biasing element coupling the wafer backstop element to a portion of the shaft near the first channel, the other biasing element biasing the wafer backstop towards the first channel.

Other systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims

BRIEF DESCRIPTION OF THE DRAWINGS

The accompanying drawings, which are incorporated in and constitute a part of this specification, illustrate multiple implementations of the present invention and, together with the description, serve to explain the advantages and principles of the invention. In the drawings:

FIG. 1 depicts a marshmallow roasting apparatus consistent with the present invention, where the apparatus includes a shaft having a retaining portion adapted to removably retain an edible wafer to the shaft.

DETAILED DESCRIPTION OF THE INVENTION

Figure 2A:
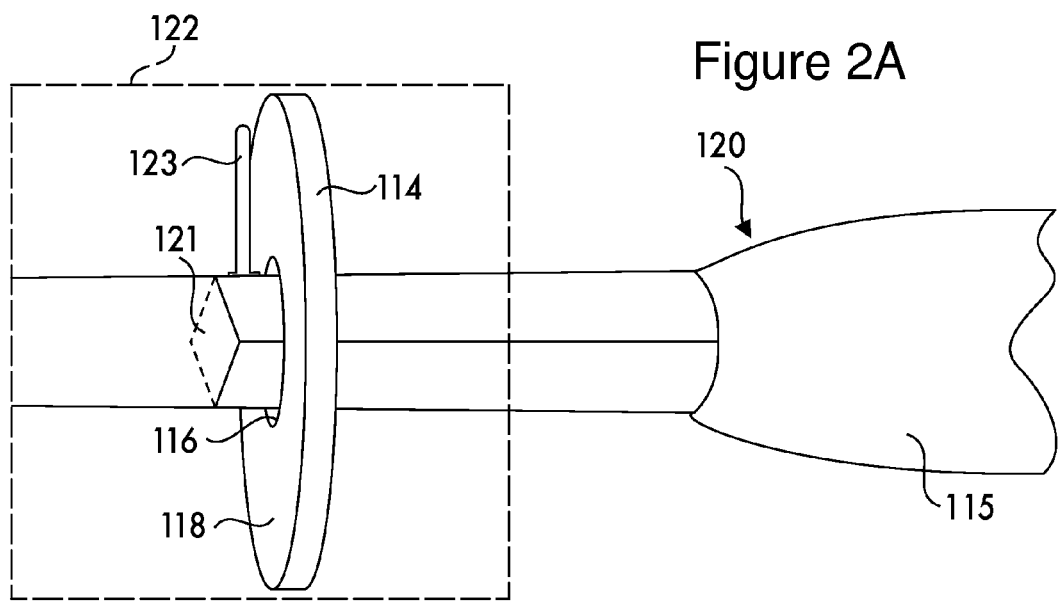
FIGS. 2A and 2B depict one implementation of the retaining portion of the shaft consistent with the present invention.

Referring now to the drawings which depict different embodiments consistent with the present invention. Wherever possible, the same reference numbers will be used throughout the drawings and the following description to refer to the same or like parts.

FIG. 1 depicts a marshmallow roasting apparatus 100 in accordance with the present invention. The roasting apparatus 100 includes a shaft 110 made of a substantially rigid material such as steel, aluminum, plastic, or other material that is not susceptible to melting or deformation when held a discernable distance from an open flame. As shown in FIG. 1, the shaft 110 has a receiving end or first end 112 shaped to receive an edible wafer (e.g., 114) via an opening 116 in the center of the edible wafer 114, and a handle 115 which has a lower coefficient of thermal conductivity than the shaft 110. Optionally, prongs 124 may be pivotally attached to the first end 112 of the shaft to enable the wafer 114 to be received on the shaft 110 when the prongs 124 are pinched or pivoted together. Thereafter the prongs 124 maybe used to retain and position a marshmallow over an open flame for roasting. The prongs 124 may be removable from the shaft 110 or retractable into a hallow area in the first end of the shaft 112. As further discussed herein, the edible wafer 114 (which may be a gram cracker or a cookie) preferably has a chocolate coating 118 on a side of the wafer 114 facing the receiving end 112 of the shaft so that the edible wafer 114 in combination with the marshmallow roasting apparatus is effective to enable a person to produce a Smore without the person having to provide and handle a separate piece of chocolate.

Continuing with FIG. 1, the roasting apparatus 100 or the shaft 110 has a second end 120 and a retaining portion 122 (shown in dashed view in FIG. 1) disposed near the second end 120 that is adapted to removably retain the edible wafer 114 as discussed in further detail below. The receiving end or first end 112 of the shaft has a shape adapted to enable the wafer 114 to travel along the first end of the shaft 112 towards the retaining portion 122. In one implementation, the shape of the first end 112 corresponds to the shape of the opening 116 in the wafer 114. In the implementation shown in FIG. 1, the shape of the first end 112 and the shape of the opening 116 in the wafer 114 are each circular. However, the shape of the first end 112 may be different from the shape of the opening 116 so long as the wafer 114 may be received on the first end via the opening 116 in the wafer 114 and the wafer 114 is able to travel towards the retaining portion 122. The shaft 110 may be tapered from the first end 112 towards the second end 120 to further enable the wafer 114 to travel towards the retaining portion 122.

If prongs 124 are installed on the first end of the shaft 112, the prongs 124 maybe pressed or pinched together and the center opening 116 in the wafer 114 is passed over the prongs 124 and onto the first end of the shaft 112. Once a edible wafer 114 is positioned on the shaft 110, the prongs are released and the marshmallows are positioned on the prongs 124 for roasting over an open flame. The prongs 124 are also made of a material which is not susceptible to melting or deformation when held over an open flame. Also, the thermal conductivity of the prong material is very low to reduce the risk of burning the user when a roasted marshmallow is removed.

In one implementation as shown in FIG. 2A, the retaining portion 122 has a second shape (e.g. a diamond shape 121 in FIG. 2A) that is different from the first shape of the first end of the shaft 112 (e.g. circular shape) such that the wafer 114 is effectively held into place when pushed from the first end 112 to the second end 120.

In this implementation, a person may apply finger force on the wafer 114 to disengage the wafer 114 from the retaining portion 122 having the second shape 121. The second end 120 of the shaft 110 may also contain a handle 115, however, the handle 115 may also be the end of the shaft 110. The wafer retaining portion 122 is large enough to hold a plurality of wafers 114 in place when the first end of the shaft 112 is tilted downward.

In the current embodiment, a wafer 114 is placed on the first end 112 and slid up to the second end 120 of the shaft 110 where the retaining portion 122 is located. Once the wafer 114 is in the retaining portion 122, the operator is able to release the wafer 114, held on the retaining portion 122 of the shaft 110, in the direction of the first end of the shaft 110.

Figure 2B:
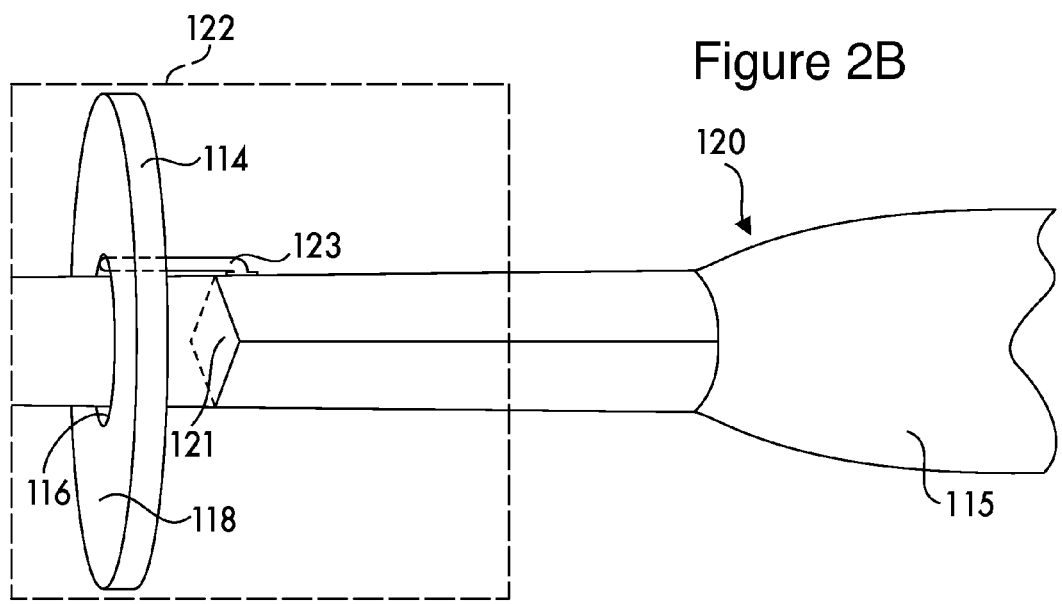

In another implementation as shown in FIGS. 2A and 2B, wafers 114 or a plurality of wafers 114 may be selectively retained in position in the retaining portion 122 by a memory flex element 123 which is made from a material which retains and returns to its previous shape after being deformed. The memory flex element 123 material may be aluminum, rubber, or another material which has the characteristic of returning to its previous form after deformation.

In this implementation, a person may apply finger force on the wafer 114 to disengage the wafer 114 from the retaining portion 122 having a second shape 121. A user may then eject one or more wafers 114 by pushing the wafer or wafers 114 in the direction of the first end of the shaft 112 thereby bending the memory flex element 123 forward allowing the wafer or wafers 114 to travel towards the first end of the shaft 112 as shown in FIG. 2B. The memory flex element 123 may also retract into a hollow area of the second end 120 of the shaft 110 located under the retaining portion 122 to allow the wafer or wafers 114 to travel towards the first end of the shaft 112 more easily. Once the wafer 114 passes over the memory flex element 123, the memory flex element 123 returns to its previous position.

Figure 3A:
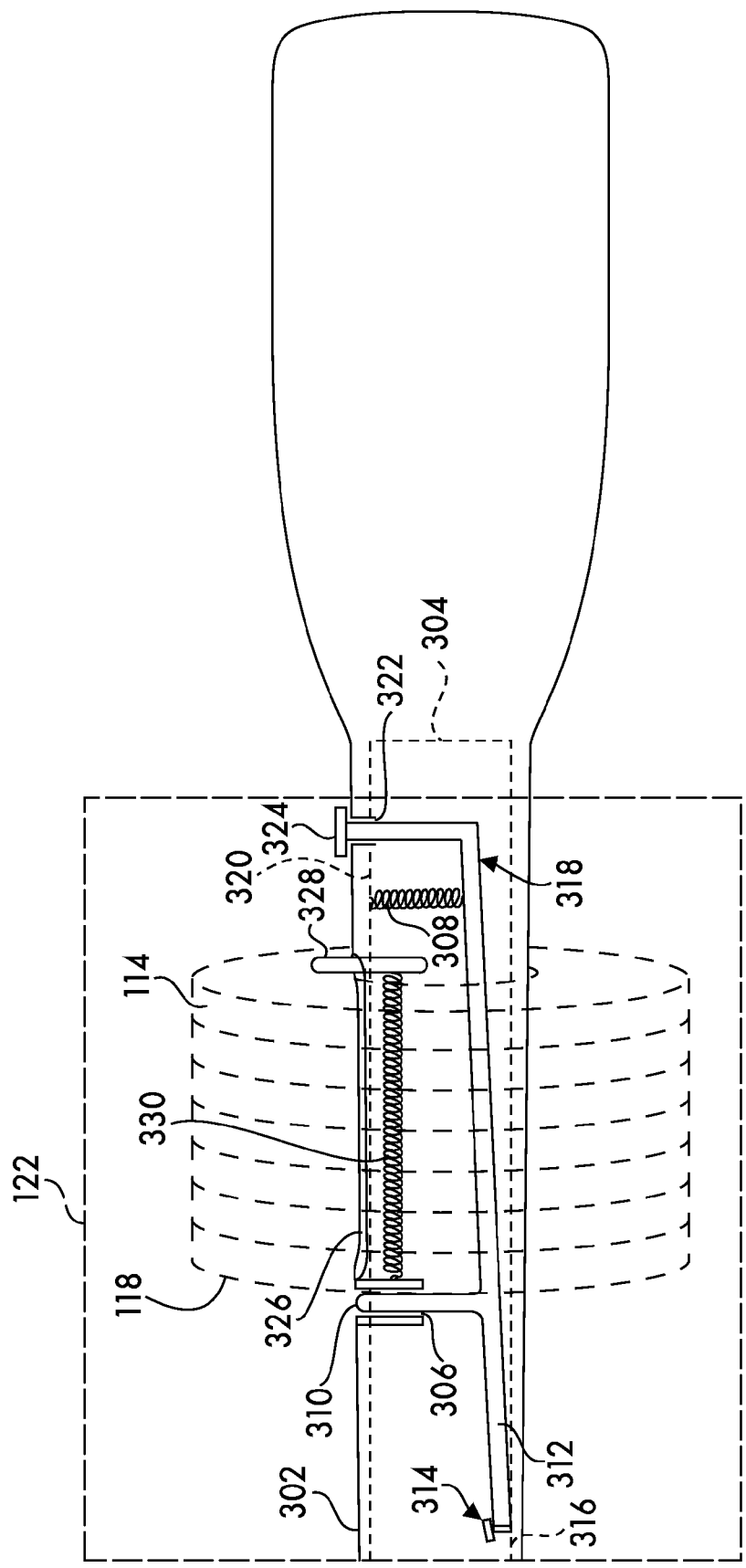
FIGS. 3A and 3B depict another embodiment of the retaining portion of the shaft consistent with the present invention.
Figure 3B:
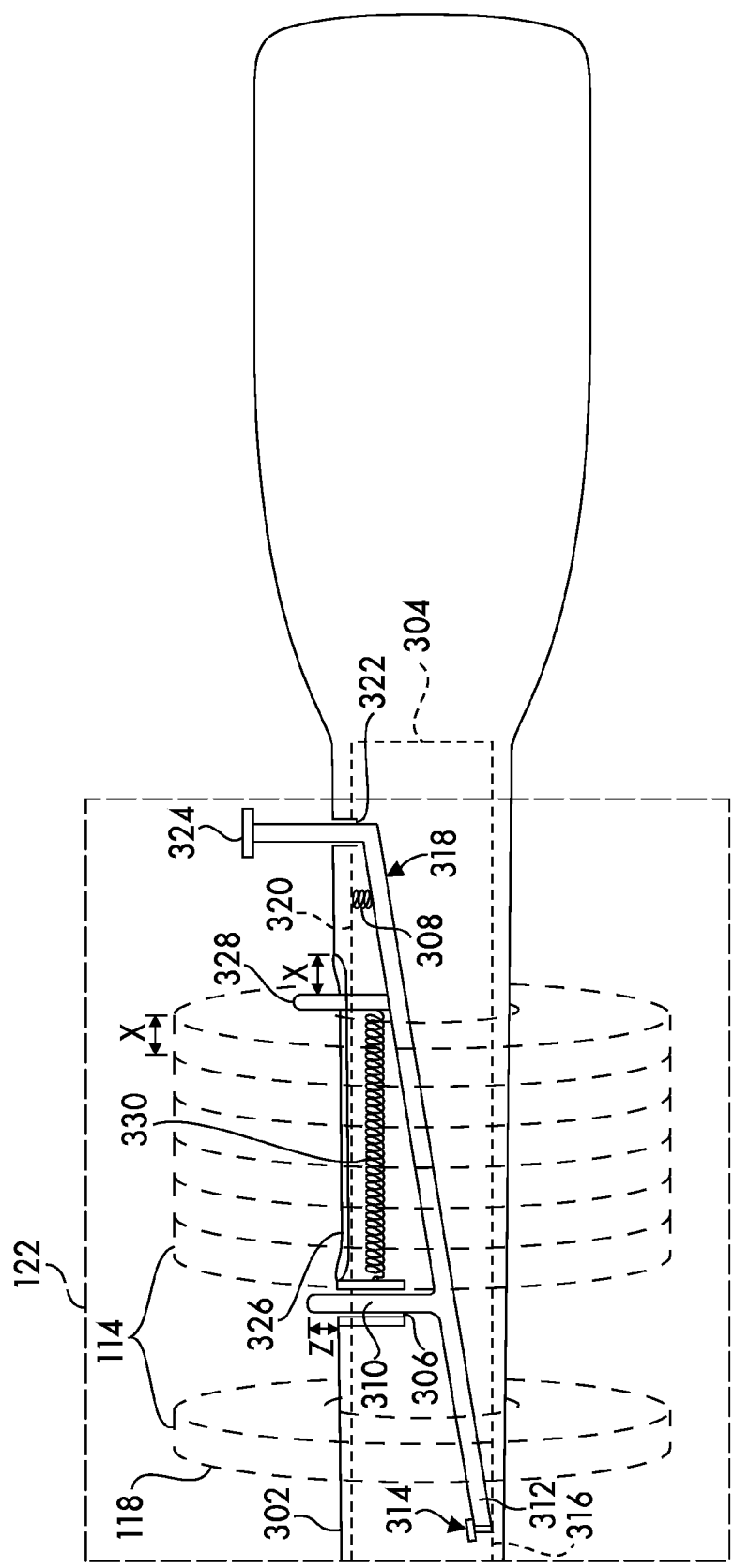

FIGS. 3A and 3B depict another embodiment of the retaining portion 122 of the shaft 110 consistent with the present invention. In this embodiment, the retaining portion 122 of the shaft 110 includes an outer surface 302 of the shaft 110, an inner chamber 304, a first channel 306 between the outer surface 302 and the inner chamber 304, a biasing element 308, and a stop element 310 operatively coupled to the biasing element 308 and disposed to travel within the first channel 306 such that the stop element 310 is adapted to be moved between a first position as shown in FIG. 3B in which the stop element 310 extends above the outer surface 302 to inhibit travel of the wafer 114 beyond the first channel 306 and a second position as shown in FIG. 3A in which the stop element 310 is lowered relative to the outer surface 302 to enable the wafer 114 to travel beyond the first channel 306.

In one implementation, the retaining portion 122 further includes a lever 312 having a first end 314 pivotally attached to a lower inner wall 316 of the chamber 304 opposite to the first channel 306 and a second end 318 operatively coupled via the biasing element 308 to an upper inner wall 320 of the chamber 304. In this implementation, the stop element 310 is attached to the lever 312 between the first end 316 and the second end 318 of the lever 312.

The stop element 310 may be a rigid member or memory flex element extending from the lever 312. The biasing element 308 may be a spring, a screw, an elastic band, a rack and pinion gear, a ratcheting mechanism or another biasing means.

As shown in FIGS. 3A and 3B, the shaft outer surface 302 defines an opening 322 relative to the second end 318 of the lever 312. The lever 312 includes a projection 324 extending from the second end of the lever 312 through the opening 322 and adapted, when depressed to counter bias the biasing element 308.

In addition, the outer surface 302 of the retaining portion 122 may also define a second channel 326 disposed between the first channel 306 and the second end 120 of the shaft 110. In this implementation, the roasting apparatus 100 further comprises a wafer backstop element (or second stop element) 328 disposed in and adapted to travel along the second channel 326, and a second biasing element 330 operatively coupled to the second stop element 328 and adapted to bias the second stop element 328 towards the first channel 306. The second biasing element 330 may be a spring, a screw, an elastic band, a rack and pinion gear, a ratcheting mechanism or another biasing means. Although the first biasing element 308 and the second biasing element 330 are illustrated as being the same type (e.g., a spring), the first biasing element 308 may be different than the second biasing element 330.

In the current embodiment, as shown in FIG. 3A, when the projection 324 is pressed, the lever 312 pivots around the connection at the lower inner wall 316 of the shaft's inner chamber 304 which, in turn, lowers the first stop element 310 within the first channel 306 into the chamber 304. When the first stop element 310 is lowered, the backstop or second stop element 328 is pulled forward through the second channel 326 by the second biasing element 330 thereby ejecting one or more of the plurality of wafers 114 from the retaining portion 122 towards the first end 112 of the shaft 110. When the projection 324 is released, the first biasing element 308 causes the lever 312 to raise a distance z as shown in FIG. 3B which, in turn, raises the first stop element 310 inhibiting a next wafer 114 from passing by the first stop element 310 and stopping the backstop or second stop element 328 from moving forward in the second channel 326 via the second biasing element 330. Thus, the first biasing element 308 may be used to automatically raise the lever 312 after pressure is removed from the projection 324.

Figure 4A:
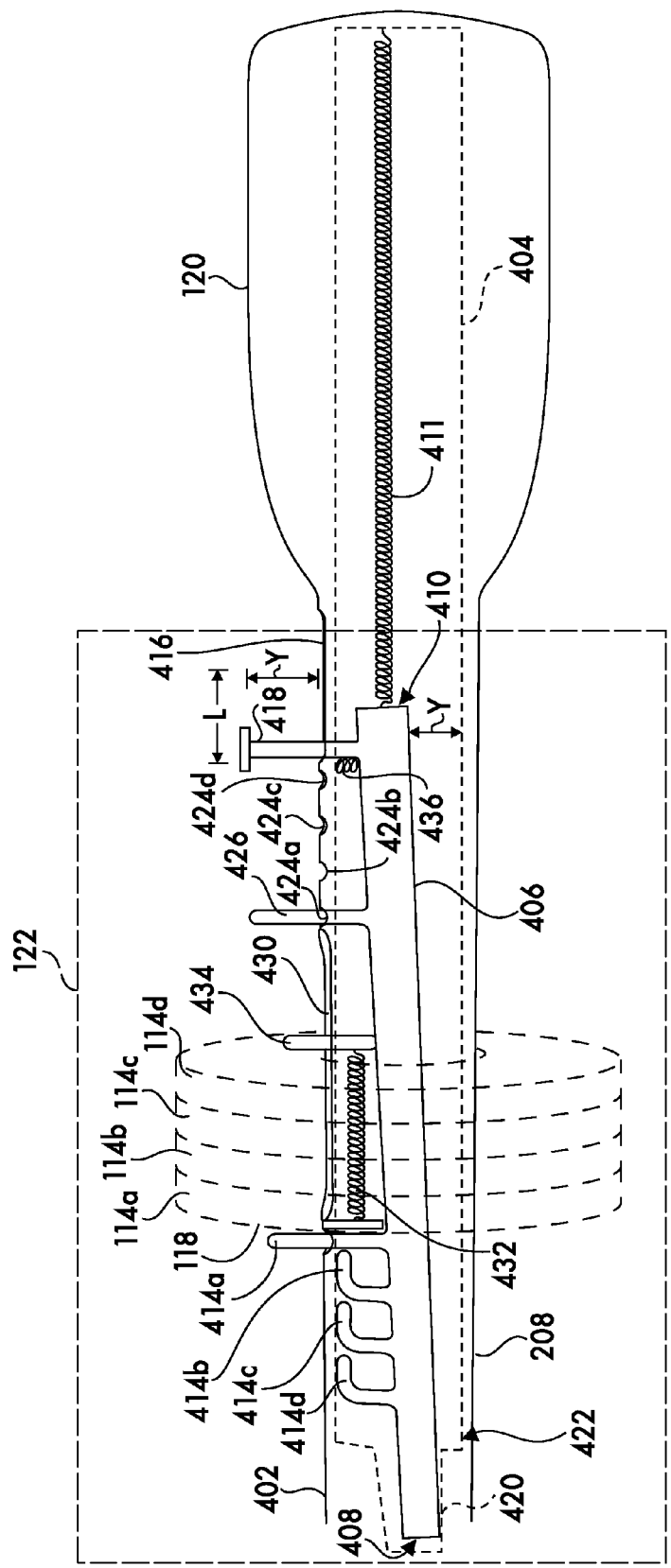
FIGS. 4A and 4B depict yet another embodiment of the retaining portion of the shaft consistent with the present invention.
Figure 4B:
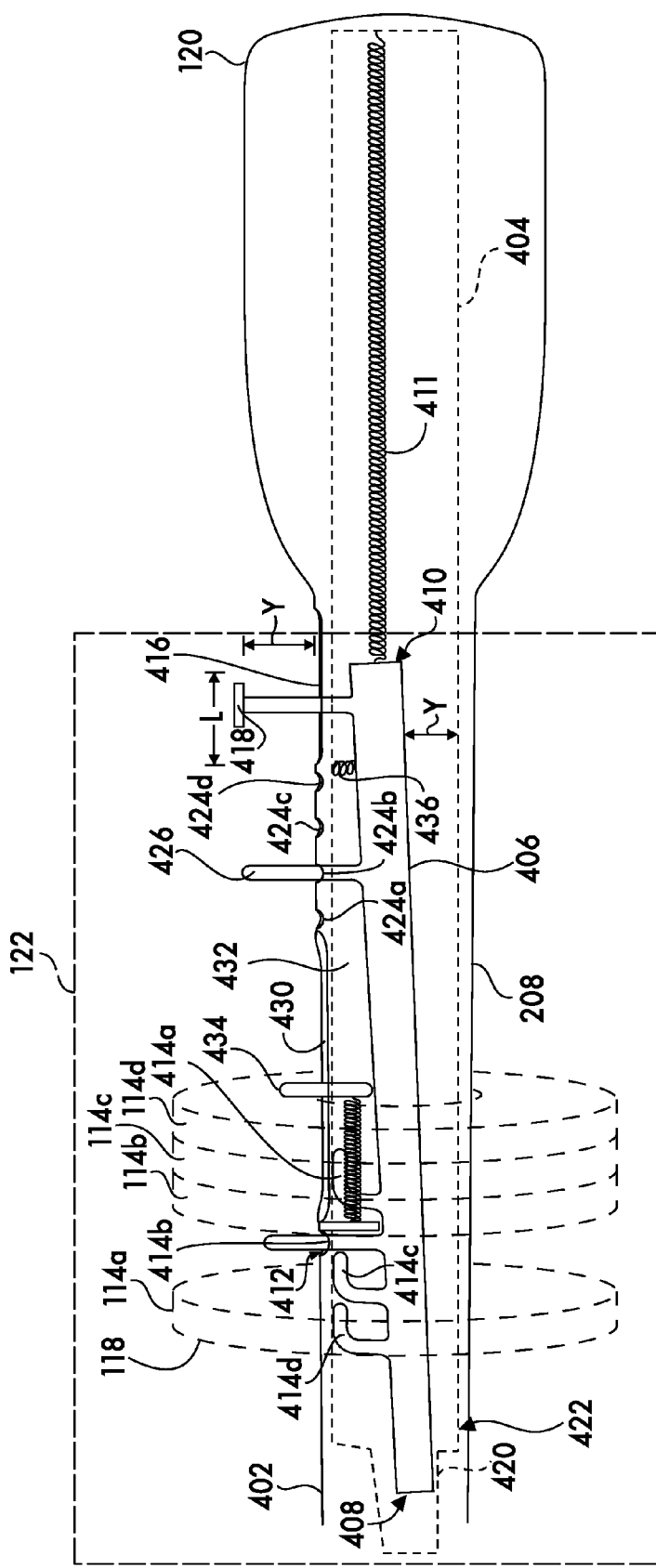

FIGS. 4A and 4B depict another embodiment of the retaining portion 122 of the shaft 110 consistent with the present invention. In this implementation, the retaining portion 122 includes an outer surface 402 of the shaft 110, an inner chamber 404, and a rod 406 disposed within the chamber 404 and having a first end 408 and a second end 410. In this implementation, the retaining portion 122 also includes a biasing element 411 operatively coupling the second end 410 of the rod 406 to the second end 120 of the shaft 110 or the inner chamber 404. The biasing element 411 may be a spring, a screw, an elastic band, a rack and pinion gear, a ratcheting mechanism or another biasing means. In the implementation shown in FIGS. 4A and 4B, the biasing element 411 is configured to contract to bias the rod 406 towards the rear or second end 120 of the shaft 110. However, in an alternative implementation, the biasing element 411 may alternatively be configured to expand to bias the rod 406 away from the rear or second end 120 of the shaft 110.

In the implementation shown in FIGS. 4A-4B, the retaining portion 122 also includes a first channel 412 disposed between the outer surface 402 and the chamber 410, and one or more memory flex stop elements 414a-414d attached to and extending from the rod 406 in proximity to the first end 408 of the rod 406. As further described herein, each memory flex stop element 414a-414d is adapted or effective to removeably engage the first channel 412 to selectively inhibit travel of a wafer 114 beyond the first channel 412 as the rod 406 is biased by the biasing element 411 in accordance with the present invention.

As shown in FIGS. 4A and 4B, the outer surface 402 of the retaining portion 122 also defines another channel 416 disposed between the first channel 412 and the second end 120 of the shaft 110 and extending a predetermined distance, L, in a direction co-axial with the shaft 110. The rod 406 includes a projection 418 extending from the second end 410 of the rod 406 though the other channel 416. The projection 418 is adapted to disengage the memory flex stop element (e.g., 414a in FIG. 4A) currently engaged in the first channel 412 from the first channel 412 when the projection 418 is depressed relative to the shaft 110, enabling a wafer (e.g., wafer 114a) to travel past the first channel 412 towards the first end 112 of the shaft 110 as shown in FIG. 4B.

In one implementation shown in FIGS. 4A and 4B, the first end 408 of the rod 406 is disposed in a lever extension area 420 that is a narrow extension of the inner chamber 404. The lever extension area 420 is sized to enable the rod 406 to be pivoted about the first end 408 of the rod 408 when the projection 418 of the rod 406 is actuated (e.g., depressed or lifted) and to enable the rod 406 to travel (at least partially) within the inner chamber 404 of the shaft 110 when the rod 406 is biased by the biasing element 411. The rod 406 may also be tapered towards the first end 408 to further enable a pivoting action of the rod 406 via the actuation of the projection 418. In an alternative implementation (not shown in the figures), the first end 408 of the rod 406 may be pivotally biased (e.g., via a spring or other biasing element) to a lower inner wall 422 of the chamber 404 in corresponding relationship with the biasing element 411 to enable the rod 406 to pivot upon actuation of the projection 418 and to enable the rod 406 to travel (at least partially) along the lower inner wall 422 of the chamber 404 when the rod 406 is biased by the biasing element 411.

In one implementation, the outer surface 402 of the retaining portion 122 may also define one or more openings 424a-424d disposed between the first channel 412 and the second channel 416. The number of openings 424a-424d correspond to a predetermined number of memory flex stop elements 414a-414d. In this implementation, the rod 406 includes a secondary stop element 426 extending from the rod 406 between the projection 418 and the memory flex stop elements 414a-414d. The secondary stop element 426, which may be a rigid member or another memory flex element, is adapted to removeably engage each opening 424a-424d in the outer surface 402 to selectively inhibit the rod 406 from traveling further within the inner chamber 404 (i.e., due to bias by the biasing element 411) when the memory flex stop element 414a, 414b, 414c or 414d corresponding to the respective opening 424a-424d removeably engages the first channel 412.

In one implementation, each adjacent pair of the memory flex stop elements 414a-414d are spaced apart a distance approximately equal to a width, X, of a wafer 114. Similarly, each adjacent pair of the openings 424a-424d are spaced apart a distance approximately equal to the width, X, of a wafer 114. To enable the projection 418 to travel along the channel 416 in this implementation, the predetermined length, L, of the channel 416 is approximately equal to or greater than the distance between the first opening 424a and the last opening 424d that the secondary stop element 426 may engage when the projection 418 is actuated in accordance with the present invention. In this implementation, each memory flex stop element 414a-414d is adapted to removeably engage the first channel 412 to inhibit travel beyond the first channel 412 of a respective one of a plurality of wafers 114 disposed on the shaft 110 in association with the secondary stop element 426 removeably engaging a corresponding one of the openings 424a, 424b, 424c or 424d in the outer surface 402 of the shaft 110.

As previously described, in the implementation shown in FIGS. 4A and 4B, the biasing element 411 biases the rod 406 and each memory flex stop elements 414a-414d toward the second end 120 of the shaft 110, and the projection 418 is adapted to disengage each memory flex stop element 414a-414d from the first channel 412 when the projection 418 is depressed relative to the shaft 110 causing the secondary stop element 426 to be disengaged from the opening 424a, 424b, 424c or 424d corresponding to the respective memory flex stop element 414a, 414b, 414c or 414d.

In the implementation depicted in FIGS. 4A and 4B, the surface 402 within the retaining portion 122 of the shaft 110 defines a third channel 430 extending a predetermined length along a direction co-axial with the shaft 110 between the first channel 412 and a closest one of the openings (e.g., opening 424a). The retaining portion 122 of the shaft 110 of the roasting apparatus 100 may also include another biasing element 432 (such as a spring, elastic band, or other biasing mechanism) and a wafer backstop element 434 disposed within and adapted to travel along the third channel 430. The biasing element 434 couples the wafer backstop element 434 to a portion of the shaft 110 near the first channel 412. The other biasing element 432 is configured to bias the wafer backstop 434 towards the first channel 412, causing the wafer backstop 430 to move one or more wafers 114a-114d along the shaft 110 (towards the first end 112 of the shaft 110) when each of the memory flex stop elements 414a-414b have been disengaged from the first channel 412.

In the implementation shown in FIGS. 4A and 4B, the projection 418 may be actuated (e.g., depressed) to disengage the secondary stop element 426 from each of the openings 424a-424d in the outer surface 402 of the shaft 110 and to disengage each of the memory flex stop elements 414a-414d from the first channel 412. While the projection 418 is actuated or depressed, the projection 418 may then be finger biased along the channel 416 towards the first end 112 of the shaft 110 counter to the bias of the biasing element 411 until the first end 408 of the rod 406 is within the lever extension area 420 and each of the memory flex stop elements 414a-414d are disposed within the chamber 404 between the first end 112 of the shaft 110 and the first channel 412. At this point or while none of the memory flex stop elements 414a-414d are engaged in the first channel 412, one or more wafers 114a-d (preferably with a chocolate bar or coating 118 facing towards the first end 112 of the shaft 110) may be inserted onto the first end 112 of the shaft 110 and moved past the first channel 412 against the wafer backstop 434 (which may be finger pushed counter to the bias of the biasing element 432). Once a sufficient number of wafers 114a-d are inserted onto the shaft 110 past the first channel 412, the projection 418 may de-actuated such that the biasing element 411 causes the rod 406 to move towards the rear or second end 120 of the shaft 110 and the rear end 410 of the rod 406 to move upwards within the inner chamber 404 until the secondary stop element 426 engages the first opening 424a in the shaft surface 402 and the first memory flex stop element 414a engages the first channel 412 as shown in FIG. 4A. A third biasing element 436 may be coupled between the upper wall of the inner chamber 404 and the rod 406 in proximity to the projection 418 to work cooperatively with the biasing element 411 to bias the rear end 410 of the rod 406 upwards within the inner chamber 404 when the projection 418 is de-actuated. While the first memory flex stop element 414a is engaged in the first channel 412, the one or more wafers 114a-d are retained on the shaft 110 between the first memory flex stop element 414a and the backstop element 434, which is being biased towards the wafers 114a-d and the first channel 412. The one or more wafers 114a-d may be accordingly retained regardless of the orientation of the shaft 110.

When projection 418 is subsequently actuated or depressed, the secondary stop element 426 is disengaged from the first opening 424a and the first memory flex stop element 414a is disengaged from the first channel 412, enabling a first of the wafers 414a to be biased (via the backstop element 434 and the biasing element 432) towards and beyond the first channel 412 as shown in FIG. 4B so that the first wafer 414a may be finger biased thereafter towards, for example, a roasted marshmallow retained on the front or first end 112 of the shaft 110. The rod 406 is simultaneously biased via the biasing element 411 towards the rear or the second end 120 of the shaft 110 and upwards (e.g., in cooperation with the third biasing element 436) until the secondary stop element 426 engages a second or next opening 424b thereby stopping the rod 406 from continuing to move and enabling a second or next memory flex stop element 414b to engage the first channel 412 to inhibit another wafer 114b from passing beyond the first channel 412 of the shaft 110 as shown in FIG. 4B.

In the implementation shown in FIGS. 4A and 4B, when the projection 418 is de-actuated, the projection 418 extends a distance, Y, above the channel 416 in the shaft 110 or the outer surface of the shaft 110 and the rear end 410 of the rod 406 is biased (via the biasing element 411 and/or the biasing element 436) upwards such that there is at least the same distance, Y, between the rear end 410 of the rod 406 and the lower wall of the inner chamber 404. In this implementation, when the projection 418 is de-actuated and the rod 406 is biased upward within the inner chamber 404, the secondary stop element 426 and each of the memory flex stop elements 414a-d extend less than the distance Y above the surface of the shaft 110 so the secondary stop element 426 and each of the memory flex stop elements 414a-d may be drawn or lowered within the inner chamber 404 when the projection 418 is actuated or finger biased as described herein.

In one implementation, each of the memory flex stop elements 414a-d has sufficient strength to stop the movement of the rod 406 and further bias by the biasing element 411 when the respective stop element 414a, 414b, 414c or 414d is engaged in the first channel 412. In this implementation, the secondary stop element 426 and the surface openings 424a-

424d need not be employed in the retaining portion 122 of the shaft 110 of the roasting apparatus 100.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. A roasting apparatus, comprising:
   a shaft having a first end adapted to receive an edible wafer via an internal opening in the wafer, a second end, and a retaining portion near the second end that is adapted to removably retain the edible wafer to the shaft,
   wherein the retaining portion includes an outer surface, an inner chamber, a rod disposed within the chamber and having a first end and a second end, a biasing element operatively coupling the second end of the rod to the second end of the shaft, a first channel disposed between the outer surface and the chamber, and a memory flex stop element attached to and extending from the rod in proximity to the first end of the rod, the memory flex stop element is adapted to removeably engage the first channel to inhibit travel of the wafer beyond the first channel, and
   wherein the outer surface of the retaining portion defines another channel disposed between the first channel and the second end of the shaft, and the rod includes a projection extending from the second end of the rod though the other channel, the projection is adapted to disengage the memory flex stop element from the first channel when the projection is depressed relative to the shaft.

2. The roasting apparatus of claim 1, wherein the first end has a first shape adapted to enable the wafer to travel along the first end of the shaft towards the retaining portion.

3. The roasting apparatus of claim 1, wherein the outer surface of the retaining portion defines a plurality of openings between the first channel and the second channel, each opening corresponding to a respective one of the number of memory flex stop elements, and the rod includes a secondary stop element, the secondary stop element is adapted to removeably engage each opening in the outer surface when the memory flex stop element corresponding to the respective opening removeably engages the first channel.

4. The roasting apparatus of claim 3, wherein the biasing element biases the rod and the memory flex stop elements toward the second end of the shaft, and the projection is adapted to disengage each memory flex stop element channel from the first channel when the projection is depressed relative to the shaft causing the secondary stop element to be disengaged from the opening corresponding to the respective memory flex stop element.

5. The roasting apparatus of claim 4, further comprising a wafer backstop element disposed within a third channel extending a predetermined length along a direction co-axial with the shaft between the first channel and the opening, and another biasing element coupling the wafer backstop element to a portion of the shaft near the first channel, the other biasing element biasing the wafer backstop towards the first channel.

* * * * *